Dec. 2, 1958    E. J. MORZ    2,862,719
SNOW SLED
Filed Jan. 8, 1957    2 Sheets-Sheet 1
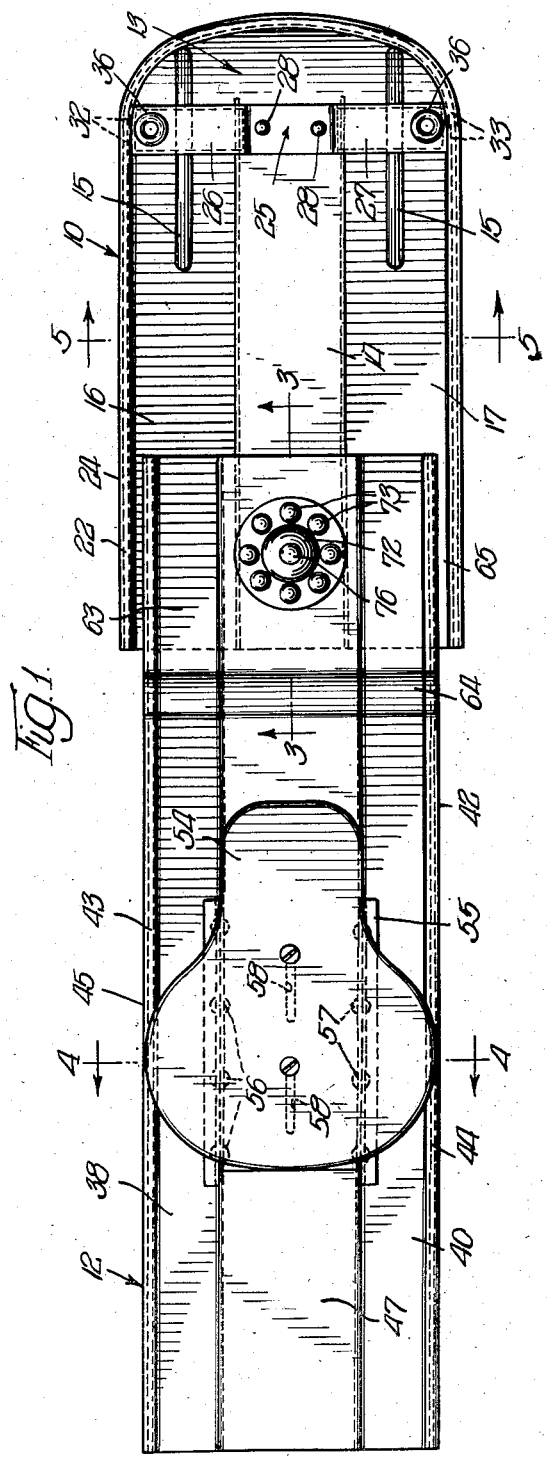
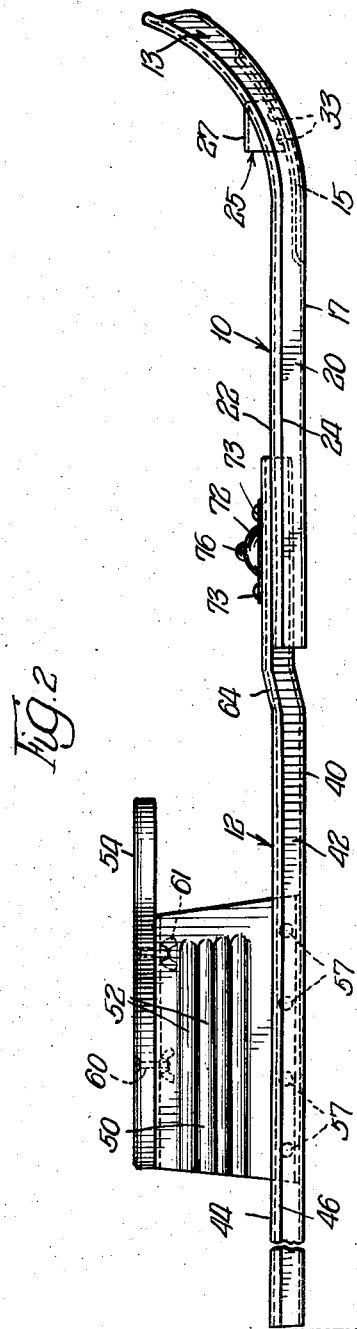
INVENTOR.
Edward J. Morz,
BY Dec. 2, 1958 E. J. MORZ 2,862,719
SNOW SLED
Filed Jan. 8, 1957 2 Sheets-Sheet 2
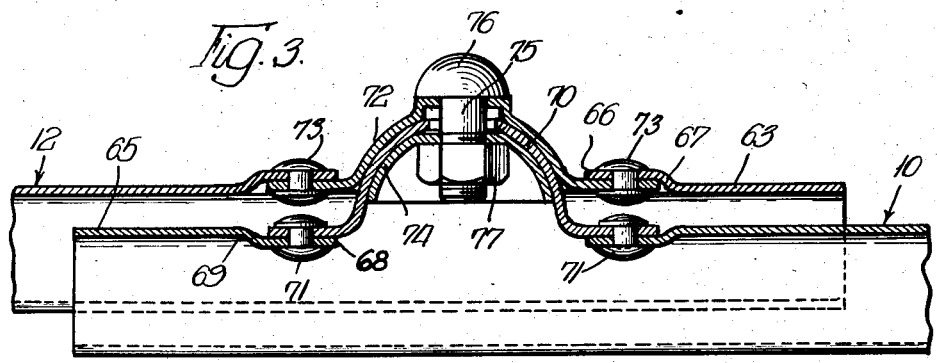
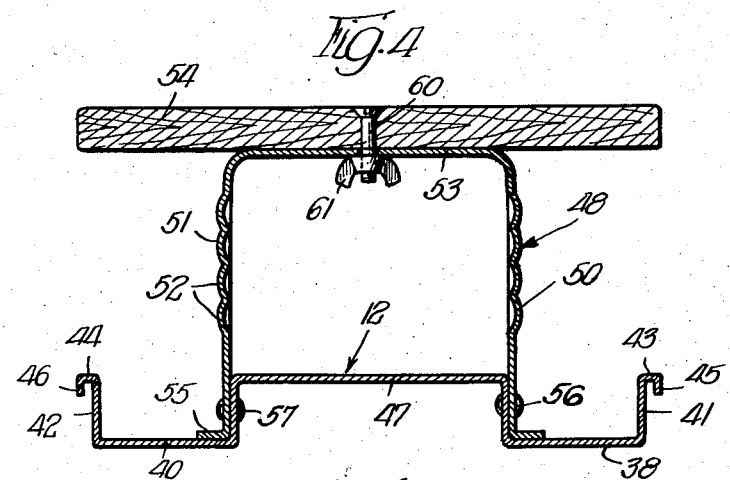
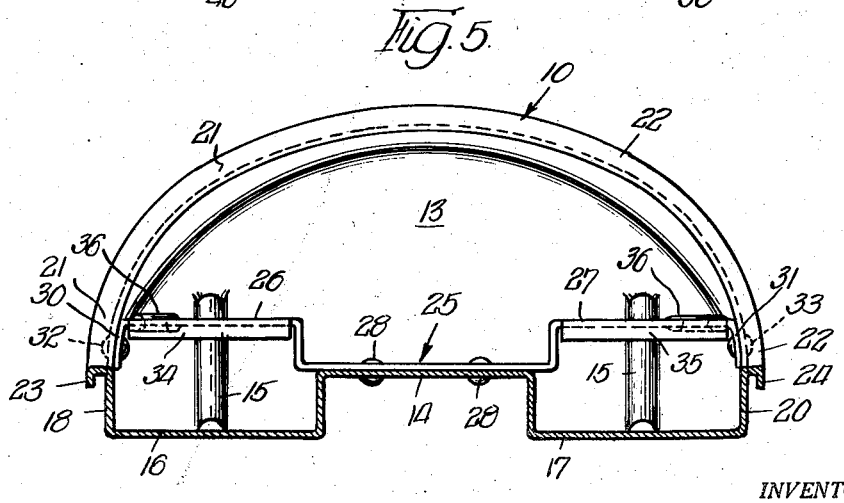
INVENTOR.
Edward J. Morz,
BY

United States Patent Office 2,862,719
Patented Dec. 2, 1958

2,862,719

SNOW SLED

Edward J. Morz, Manitowoc, Wis., assignor to Mirro Aluminum Company, Manitowoc, Wis., a corporation of New Jersey Application January 8, 1957, Serial No. 633,008

5 Claims. (Cl. 280—16)

The invention relates to sleds and has reference more particularly to a bob sled including front and rear sections which are pivotally connected together to provide the necessary flexibility required for proper steering and control.

An object of the invention is to provide a sled of the articulated two-part type and which will be so designed that the front and rear sections can be stamped from metal, preferably aluminum, so as to achieve strength as well as lightness, and wherein both stampings will provide broad flat runners, with the runners of the rear section being disposed in tandem to the runners of the front section when the sections are assembled.

Another object is to provide a bob sled having front and rear sections which are pivotally connected by a universal joint and wherein the rear section provides an adjustable seat for the operator and the front section provides heel rests to assist the operator in steering and controlling the sled.

Another and more particular object is to provide a two-part snow sled having novel and improved means in the form of a universal joint for pivotally connecting the sectional parts and wherein the said joint includes a ball formation provided on the rear section and a cup formation provided on the front section.

A still further object of the invention is to provide a two-part sled having a universal joint pivotally connecting the parts together, both sections being characterized by a shape transversely thereof which simulates a double channel whereby the structure achieves the two-fold function of strengthening the bottom wall of each section and of additionally forming the required runners for the sled.

Another object of the invention is to provide a snow sled having the shape of a double channel transversely of each section to provide the spaced runners for the sled and to form a central raised portion between the runners, and wherein the seat support is secured to the central raised portion of the rear section with the heel rests being secured to the central raised portion of the front section.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a top plan view illustrating the bob sled of the present invention;

Figure 2 is a side elevational view of the bob sled shown in Figure 1;

Figure 3 is a sectional view taken along line 3—3 of Figure 1, illustrating structural details of the universal joint for connecting the sections of the sled;

Figure 4 is a transverse sectional view taken along line 4—4 of Figure 1; and

Figure 5 is a transverse sectional view along line 5—5 of Figure 1.

A preferred embodiment of snow sled as illustrated in the drawings essentially consists of a front section identified by numeral 10 and a rear section identified by numeral 12. Each section preferably consists of a stamping of metal such as aluminum so as to combine lightness with adequate strength and it will be observed that each section transversely thereof, as shown in Figures 4 and 5, is characterized by the shape of a double channel, or, in other words, runners are formed in each section by the provision of flanges along each side and by the provision of a raised portion centrally of the section and which thus extends longitudinally thereof to space the runners.

Referring more particularly to the front section and to Figure 5, the front of this section is bent upwardly to form a nose portion 13, said portion constituting the front of the snow sled and which is strengthened to a certain extent by the central raised portion 14, the same terminating, however, in the front nose of the sled. This front section is additionally strengthened by the longitudinally extending grooves 15 formed in the runners 16 and 17 of this front section. Along each side of this front section 10 the metal is bent upwardly to form a side flange 18 and 20, respectively, and the metal is further bent horizontally, forming a top flange such as 21 and 22, and then the short terminal edge is bent downwardly, providing depending flanges 23 and 24. Accordingly, each side edge of the front section is finished in an attractive manner and the same has an additional utility which is functional in that the combination of flanges serves to strengthen each side edge. It will be further noted that the combination of flanges along the side edges of the section continues around the nose portion 13 so that said nose portion has an attractive appearance and the portion is likewise adequately strengthened and reinforced by this structural arrangement.

The runners 16 and 17 for this front section are relatively broad and flat and said runners extend in parallel relation to each other for the length of said section. At the forward end, in the vicinity of the grooves 15, there is located a member 25 of special shape, such as to provide a pair of heel rests 26 and 27. It is convenient to secure the member 25 to the central raised portion 14 of this section, for which purpose rivets such as 28 are employed, as best shown in Figure 5. At each side of the member beyond the heel rests 26 and 27, the material thereof is flanged downwardly as at 30 and 31 and said flanges are respectively secured to the side flanges 18 and 20 of this front portion. Rivets such as 32 are employed for securing flange 30 of heel rest 26 to side flange 18 and in a similar manner rivets 33 are employed to secure flange 31 to the side flange 20. That portion of member 25 forming the heel rests is bent so that it lies in a plane above the central section of the member and which is secured to 14 by the rivets 28. Thus, the heel rests are properly elevated above the bottom of the front section to best accommodate the operator and the metal of each heel rest is additionally flanged along both front and rear edges, the same being designated by numerals 34 and 35, respectively, the flanges adding strength to the heel rests in addition to adding to the attractive appearance of the sled. A grommet, such as 36, of metal, and with smooth interior surfaces, is located in each heel rest for the purpose of receiving one end of a rope tied to the sled, said rope being conventional for snow sleds of this type and enabling the operator to pull the sled whenever desired.

The shape of the rear section transversely thereof is similar to the front section, although the overall width of the rear section is less than that of the front section so that as a result the width of the spaced parallel runners 38 and 40 is less than runners 16 and 17. Along each side edge of this rear section the metal thereof is flanged upwardly as at 41 and 42 and the metal then extends horizontally to form the top flanges 43 and 44, and is finally bent downwardly to provide the short depending flanges 45 and 46, whereby the formation of the side edges is substantially the same for both sections.

The central raised portion 47 for the rear section extends longitudinally thereof and functions to space the runners 38 and 40. This central raised portion is additionally utilized as securing means for the seat support designated in its entirety by numeral 48. Said support is substantially in the form of an inverted U, having a paid of side walls 50 and 51, which are fluted at 52 for decorative purposes. The side walls are connected by the top wall 53 which supports the wooden seat 54. The lower side edges of the support 48 have the terminal flanges 55 formed thereon and it will be observed that the space between the side walls 50 and 51 is such as to accommodate the central raised portion 47 of this section. Rivets such as 56 are employed to secure the side wall 50 to the portion 47 and in a similar manner rivets 57 are employed to secure the side wall 51 to the said portion. It may be desirable at times to adjust the position of the wooden seat 54 on said support 50 and, in order to provide for this adjustment, wall 53 is formed with a pair of longitudinally aligned slots 58. A screw with a countersunk head such as 60 is located in each slot, said screw having a secured relation with the wooden seat 54 and depending below the top wall 53 where its threaded end receives a wing nut 61 by means of which the wooden seat 54 can be held in desired adjusted position.

The universal joint for pivotally connecting the rear sections is shown in detail in Figure 3. The overlapping front end, identified by numeral 63 and forming part of the rear section, is bent at 64, Figures 1 and 2, into an elevated plane so that said end is conveniently spaced above the rear end 65 of the front section and in overlapping relation therewith. Each overlapping end is formed with an opening such as 66 for the rear section, and 68 for the front section. The metal adjacent opening 66 is dished upwardly as at 67 and the metal around opening 68 is dished downwardly as at 69. A member is located in each opening, the same being riveted to its respective sections. The opening 68 receives a ball shaped member 70 and said member is riveted in place by rivets 71. A cup shaped member 72 rests on the ball member and said cup member is riveted to the rear section within opening 66 by the rivets 73. An arcuate washer 74 is located within ball member 70 and the universal joint thus formed is completed by the bolt 75, having the head 76 located above and in contact with the cap member 72 and also having the nut 77 in contact with washer 74.

When the sled is in use the operator sits on seat 54 and has his feet in contact with the heel rests 26 and 27. The rope, not shown, but which is tied to the front section by means of the grommets 36, may also be held by the operator to assist in controlling the sled. Steering is done by the feet in causing pivotal movement of the front section relative to the rear section and said pivotal movement is of course provided for by the universal joint. The runners of the sled as formed on both sections are relatively broad and flat and in the formation of the runners a raised central portion is provided, which is employed as securing and supporting means for the member 25, providing heel rests, and for the member 50, which in turn adjustably supports the seat 54.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a snow sled, in combination, a front section and a rear section disposed in tandem relation and with the front end of the rear section overlapping the rear end of the front section, means in the form of a universal joint pivotally connecting the sections, said universal joint including a ball-shaped member projecting upwardly from the rear end of the front section and a cup-shaped member projecting upwardly from the front end of the rear section and which receives and rotates on the ball-shaped member, each section comprising a substantially rectangular metal member having a shape transversely thereof simulating a double channel, whereby a longitudinally extending runner is formed along each side edge of the sections respectively and wherein the runners of each section are spaced by a central portion having location in a plane above the runners, a seat support secured to the central portion of the rear section, a seat adjustably fixed to the seat support, and a pair of heel rests secured to the central portion of the front section.

2. A snow sled as defined by claim 1, wherein the ball-shaped member of the universal joint comprises an insert located within an opening formed in the central portion of the front section and being secured thereto, and wherein the cup-shaped member of the universal joint comprises an insert located within an opening formed in the central portion of the rear section and being secured thereto.

3. A snow sled as defined by claim 1, wherein the outside edge of each runner terminates in a double flange located substantially in the same plane as the central portion, the outside edge of each runner being thereby adequately strengthened and structurally finished to present an attractive appearance.

4. In a snow sled, in combination, a front section and a rear section disposed in tandem relation and with the front end of the rear section overlapping the rear end of the front section, a universal joint connecting the overlapping ends of the sections whereby the sections are pivotally connected to each other, each section comprising a substantially rectangular metal member having a shape transversely thereof simulating a double channel, whereby a longitudinally extending runner is formed along each side edge of the sections respectively and wherein the runners of each section are spaced by a central portion having location in a plane above the runners, the runners of the rear section being of less width than the runners of the front section and having location within the runners of the front section at the overlapping ends of the sections, the central portion of the front section being of less width than that of the rear section and which has location within the central portion of the rear section at the overlapping ends of the sections, a seat support secured to the central portion of the rear section, a seat adjustably fixed to the seat support, and a pair of heel rests secured to the central portion of the front section.

5. A snow sled as defined by claim 4, wherein the universal joint includes a ball-shaped member projecting upwardly from the central portion of the front section and a cup-shaped member projecting upwardly from the central portion of the rear section and which receives and rotates on the ball-shaped member.

References Cited in the file of this patent

UNITED STATES PATENTS

| | | |
|---|---|---|
| 1,026,023 | Diener et al. | May 14, 1912 |
| 1,447,094 | Luhrs et al. | Feb. 27, 1923 |
| 1,489,289 | Vogel | Apr. 8, 1924 |
| 2,148,644 | Riefschnider | Feb. 28, 1939 |
| 2,155,669 | Lofgren | Apr. 25, 1939 |
| 2,367,157 | Tufts | Jan. 9, 1945 |
| 2,735,690 | Paden et al. | Feb. 21, 1956 |
| 2,829,902 | Stocker | Apr. 8, 1958 |

FOREIGN PATENTS

| | | |
|---|---|---|
| 255,835 | Switzerland | Feb. 1, 1949 |